United States Patent
Fares et al.

(10) Patent No.: US 10,262,486 B2
(45) Date of Patent: *Apr. 16, 2019

(54) SYSTEMS AND METHODS FOR REMOTE ACCESS RIGHTS AND VERIFICATION

(71) Applicant: ACSYS HOLDINGS LIMITED, Wanchai OT (HK)

(72) Inventors: Ahmad Fares, Beirut (LB); David Meganck, Guang Dong (CN); Karim Belhadia, Guang Dong (CN); Jean Mouradian, Guang Dong (CN)

(73) Assignee: ACSYS HOLDINGS LIMITED, Wanchai (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,675

(22) Filed: Apr. 20, 2018

(65) Prior Publication Data

US 2018/0240293 A1 Aug. 23, 2018

Related U.S. Application Data

(63) Continuation of application No. 15/415,835, filed on Jan. 25, 2017, now Pat. No. 9,984,524.

(Continued)

(51) Int. Cl.
G07C 9/00 (2006.01)
G07C 1/10 (2006.01)
(Continued)

(52) U.S. Cl.
CPC .......... G07C 9/00857 (2013.01); G07C 1/10 (2013.01); G07C 9/00309 (2013.01);
(Continued)

(58) Field of Classification Search
CPC .............. G07C 9/0069; G07C 9/00103; G07C 9/00309; G07C 9/00571; G07C 9/00857;
(Continued)

(56) References Cited

U.S. PATENT DOCUMENTS 5,091,618 A 2/1992 Takahashi
7,650,509 B1 1/2010 Dunning
(Continued)

FOREIGN PATENT DOCUMENTS

DE 19612026 A1 10/1997
DE 102007058481 A1 6/2009
(Continued)

OTHER PUBLICATIONS

International Search Report and Written Opinion, dated Jan. 29, 2016 for PCT/IB2015/000715.
(Continued)

*Primary Examiner* — Orlando Bousono
(74) *Attorney, Agent, or Firm* — Bryan Cave Leighton Paisner LLP (57) ABSTRACT

An access control system is provided that enables a network operations center to manage and control access to a plurality of remote sites and to verify servicing of the remote sites. Individuals in possession of electronic programmable keys can be provided opening codes to activate their keys while in the field, and to enable the keys to access one or more electronic locks located at the remote sites. Usage information associated with the utilization of the electronic programmable keys at the remote sites is stored on the electronic programmable keys. A lock attendance code is generated by the keys to verify attendance at the remote locations. The lock attendance codes are then transmitted to the network operations center where they are decoded to verify servicing of the remote sites.

20 Claims, 4 Drawing Sheets

Related U.S. Application Data (60) Provisional application No. 62/287,245, filed on Jan. 26, 2016.

(51) Int. Cl.
  *G06F 21/35* (2013.01)
  *H04W 12/08* (2009.01)
  *G07C 1/20* (2006.01)

(52) U.S. Cl.
  CPC .......... *G07C 9/00896* (2013.01); *G06F 21/35* (2013.01); *G07C 1/20* (2013.01); *G07C 9/0069* (2013.01); *G07C 2009/0088* (2013.01); *G07C 2009/00261* (2013.01); *G07C 2009/00396* (2013.01); *G07C 2009/00753* (2013.01); *G07C 2009/00769* (2013.01); *G07C 2209/08* (2013.01); *H04W 12/08* (2013.01)

(58) Field of Classification Search
  CPC ...... G07C 9/00896; G07C 2009/00261; G07C 2009/00396; G07C 2009/00753; G07C 2009/00769; G07C 2009/0088; G07C 2209/08; G07C 1/10; G07C 1/20; G06F 21/35; H04W 12/08
  See application file for complete search history.

(56) References Cited

U.S. PATENT DOCUMENTS

| | | |
|---|---|---|
| 2002/0099945 A1 | 7/2002 | McLintock et al. |
| 2002/0180582 A1 | 12/2002 | Nielsen et al. |
| 2003/0231550 A1 | 12/2003 | Mcfarlane |
| 2004/0003257 A1 | 1/2004 | Au |
| 2004/0046018 A1 | 3/2004 | Dobbins et al. |
| 2004/0078563 A1 | 4/2004 | Kimes et al. |
| 2005/0130723 A1 | 6/2005 | Grivas et al. |
| 2006/0049922 A1 | 3/2006 | Kolpasky et al. |
| 2006/0179057 A1 | 8/2006 | Moretti et al. |
| 2007/0176739 A1 | 8/2007 | Raheman et al. |
| 2009/0179735 A1 | 7/2009 | Van Rysselberghe et al. |
| 2009/0320538 A1 | 12/2009 | Pellaton et al. |
| 2010/0176917 A1 | 7/2010 | Bacarella et al. |
| 2011/0025459 A1 | 2/2011 | Denison et al. |
| 2011/0050390 A1 | 3/2011 | Denison et al. |
| 2011/0050391 A1 | 3/2011 | Denison et al. |
| 2011/0057774 A1 | 3/2011 | Van Rysselberghe et al. |
| 2011/0128121 A1 | 6/2011 | Shachar et al. |
| 2011/0130134 A1 | 6/2011 | Van Rysselberghe et al. |
| 2011/0156866 A1 | 6/2011 | Denison et al. |
| 2011/0187496 A1 | 8/2011 | Denison et al. |
| 2011/0210818 A1 | 9/2011 | Denison et al. |
| 2012/0213362 A1 | 8/2012 | Bliding et al. |
| 2013/0021156 A1 | 1/2013 | Roatis et al. |
| 2013/0024222 A1 | 1/2013 | Dunn et al. |
| 2014/0340194 A1 | 11/2014 | Roatis et al. |
| 2015/0287252 A9 | 10/2015 | Roatis et al. |
| 2015/0332533 A1 | 11/2015 | Meganck |
| 2015/0337562 A1 | 11/2015 | Bacarella et al. |
| 2016/0307380 A1 | 10/2016 | Ho et al. |

FOREIGN PATENT DOCUMENTS

| | | |
|---|---|---|
| EP | 1728945 A1 | 12/2006 |
| GB | 2340644 A | 2/2000 |
| WO | 2008136844 A1 | 11/2008 |

OTHER PUBLICATIONS

Dan Awtrey, A Layman's Overview of 1-Wire Technology and its Use, Aug. 13, 2002, XP055078262, Retrieved from the Internet: URL: http://web.archive.org/web/20070908075711/http://1wire.org/Files/Awtrey/Articles/Intro%20to%01-Wire.doc.

Wolfgang Rankyl and Wolfgang Effing, Handbuch der Chipkarten: Aufbau—Funktionsweise—Einsatz von Smart Cards, 1999, XP002746611, ISBN: 3-446-21115-2, Carl Hanser Verlag Munchen Wien, Germany.

Figure 4

SYSTEMS AND METHODS FOR REMOTE ACCESS RIGHTS AND VERIFICATION

CROSS-REFERENCE TO RELATED APPLICATIONS

This application claims the benefit to and is a continuation of U.S. patent application Ser. No. 15/415,835 filed on Jan. 25, 2017, which claims benefit to U.S. Provisional Application No. 62/287,245 filed on Jan. 26, 2016. The contents of these applications are hereby incorporated by reference in their entireties.

FIELD OF THE INVENTION

The present invention is related to access control systems and, more particularly, to techniques for remotely granting and managing access rights to sites and assets in secure remote locations protected by electronic key and lock systems, and remotely verifying access to such secured locations and assets.

BACKGROUND

In electronic key and lock systems, electronic programmable keys are generally blocked or disabled from unlocking a lock or padlock until they are provided with an opening code. The electronic programmable keys are typically equipped with a keypad for entering an opening code, which may be a sequence of letters, numbers, or both. Once a key holder enters an opening code into the electronic programmable key, the key is enabled to unlock the lock or padlock. Thus, in comparison to conventional mechanical key and lock systems, additional security is provided against fraudulent usage or when keys are lost or stolen because the lost or stolen key is unusable without a valid opening code.

In some cases, electronic programmable keys may be programmed to unlock a lock or padlock according to certain access rights. More specifically, an electronic programmable key may be programmed to only unlock a designated set of locks or padlocks, and only at certain predetermined times of the day, week, month, and/or year. Moreover, electronic programmable keys or locks may store records of access logs that show the times and locations where the key was used.

For a variety of different reasons, individuals (e.g., staff members and contractors) may need to perform pre-defined tasks at remote sites that require an electronic programmable key in order to gain entry. In many cases, the individuals may already be in possession of the electronic programmable key that provides access to the remote sites. However, before traveling to the remote sites, the individuals are typically required to travel to an operations center (or other location) in order to program the key that provides access to the remote site. An administrator at the operations center may program the keys by connecting them to key programming devices which are typically integrated with stationary computing systems or networks such as, for example, a desktop computer. In order for the individuals to be able to successfully operate the electronic programmable keys in the desired locks, they may be required to request a valid opening code from the administrator, which can be entered into the key in order to enable the key to unlock the desired locks. Thus, an administrator cannot grant—and a key holder cannot efficiently request—new opening codes, access rights or access logs in real-time, while the key holder is in the field or within proximity to the lock to which access is desired.

In addition, an administrator cannot directly verify that certain tasks have been completed without recovering the keys or accessing the locks, and may have to rely instead on the user to manually report such activities. Consequently, the individuals are often required to return to the operations center a second time after they have completed their task at the remote site in order to return the key and/or to verify that they have completed their task. The key programming devices that were used to program the keys may also be used to download a record of access logs generated by the key in order to accomplish this. Requiring the individuals to travel back and forth to the operations center is inefficient and can be costly in terms of both time and fuel consumption. This is especially true if the operations center is located far away from the individuals' initial location, or far away from the remote site that the individuals are seeking to access.

Accordingly, a need exists to provide an access control system that includes an efficient mechanism for remotely providing an individual with access to a secured location while in the field and verifying that the individual accessed the secured location and/or completed tasks at the secured location.

SUMMARY OF THE INVENTION

An access control system is provided that enables a facilities manager, administrator, or network operations center to manage and control access to a plurality of remote sites and to verify servicing of the remote sites. Service requests may be transmitted to individuals in possession of electronic programmable keys. The individuals are provided opening codes to activate their keys while the individuals are in the field or located remotely with respect to the network operations center. The opening codes enable the keys to access one or more electronic locks located at the remote sites. Each time an electronic programmable key engages an electronic lock, usage information associated with the interaction may be stored on the electronic programmable key. A lock attendance code is generated by the keys to verify attendance of the individuals at the remote location stored by the lock. The lock attendance code is based, at least in part, on the usage information. The lock attendance codes may be transmitted to the network operations center where they are decoded to verify servicing of the remote sites. In this manner, the access control system enables the network operations center to provide on-demand and real-time access to any individual having an electronic programmable key who is requested to service a remote site, and to verify that the individuals attended to the service requests at the remote sites.

In certain embodiments, an access control system is provided for controlling access to one or more secured areas of a site. The access control system includes one or more electronic locks located at a site, and an electronic programmable key which includes a processor and a non-transitory storage device for storing instructions. Execution of the instructions causes the electronic programmable key to receive an opening code via an input device integrated into the electronic programmable key, and activate the electronic programmable key to open the one or more electronic locks in response to determining that the opening code is valid. The instructions further cause a lock attendance code to be generated using a verification function stored on the electronic programmable key. The lock attendance code comprises an encoded string that is decodable to verify engagement of the electronic programmable key with the one or more electronic locks.

In certain embodiments, a method is provided for controlling access to one or more secured areas of a site. The method comprises the steps of receiving an opening code via an input device integrated into an electronic programmable key and activating the electronic programmable key to enable opening of one or more electronic locks located at a site in response to determining that the opening code is valid. The method further comprises generating a lock attendance code using a verification function stored on the electronic programmable key. The lock attendance code comprises an encoded string that is decodable to verify engagement of the electronic programmable key with the one or more electronic locks.

These and other features and advantages will become apparent from the following detailed description of illustrative embodiments thereof, which is to be read in connection with the accompanying drawings.

BRIEF DESCRIPTION OF DRAWINGS

The inventive principles are illustrated in the figures of the accompanying drawings which are meant to be exemplary and not limiting, in which like references are intended to refer to like or corresponding parts, and in which.

DETAILED DESCRIPTION OF CERTAIN EMBODIMENTS

In accordance with certain embodiments, an access control system is disclosed that permits an administrator and/or operations center associated with one or more remote sites to verify whether individuals (e.g., staff and contractors) accessed one or more locks at the secured locations. The remote sites may represent secured locations such as phone towers, radio towers, fueling sources, fueling stations or any other facilities or locations that utilize key and lock systems to provide security at the sites. Each remote site may include one or more electronic locks that protect access to, or assets located at, the remote site. An individual who desires access to a remote site may utilize an electronic key to access the remote site.

In certain embodiments, the individual may be required to obtain an opening code to activate the electronic key prior to utilizing the key to open the one or more locks at the remote site. The present invention permits the individual to obtain the opening code while he or she is in the field or in proximity to the remote site without reporting to an operations center to do so. The individual may request, or may receive, an opening code via a short message service (SMS) text message, or via an application installed on a mobile device that is being operated by the individual. Thus, an individual that is required to perform pre-defined tasks at remote locations can be asked to go directly to such sites instead of commuting back and forth to an operations center to program the key and/or to obtain access rights. This results in higher staff productivity, lower costs, lower fuel consumption and a smaller carbon footprint.

Each time the individual attempts to open an electronic lock at the secured location using the electronic key, access logs maintained by the electronic lock are updated to include information pertaining to the entry attempt and the updated access logs are downloaded to a storage device on the electronic key. The individual may then select an option on the electronic key to initiate a verification function that generates a lock attendance code. As explained in further detail below, the lock attendance code may be generated in various ways and may be embedded with various types of information associated with using the electronic key. The lock attendance code is transmitted to the administrator and/or operations center. The administrator and/or operations center utilize the lock attendance code to confirm that the individual successfully accessed one or more locks at the secured location. Alternatively, the administrator may request the user to come periodically (e.g., biweekly or monthly) to the operations center in order to download the access log and verify that only authorized access took place in the past time period.

The access control system described herein may be utilized to provide selective access to any secured site. In certain embodiments, the access control system may be utilized to provide selective access to sites such as cell phone towers, radio towers and/or other facilities that include communications equipment. The access control system may provide contractors, maintenance persons or repairpersons access to specific areas at these sites. For example, an opening code provided to maintenance personnel or staff may enable such individuals to access communications equipment or other areas at the remote site that require maintenance (while excluding those individuals from other areas of the remote site), and an opening code provided to a contractor or repairperson may enable the individual to access areas of the remote site which require repairs (while excluding the individual from other areas). In certain embodiments, the access control system may additionally, or alternatively, be utilized to provide selective access to fueling stations. Again, the opening codes provided to maintenance personnel or staff may allow those individuals to access fueling containers requiring maintenance operations (e.g., such as re-filling operations), while restricting the personnel from accessing other areas that are unrelated to the tasks which are to be performed by the personnel. In even further embodiments, the opening codes can be used in a residential context to provide access to one or more areas of a residence (e.g., to a garage and/or front door of the household) and to select individuals (e.g., baby sitters, superintendents, or guests) at specific times.

The embodiments described in connection with the present invention provide a variety of advantages over conventional access control systems. A major advantage provided by the access control system described in certain embodiments is the ability to significantly increase operational efficiency, expand the number of sites that can be serviced, reduce down-time at the sites and enhance the security at the sites. This is due, at least in part, to two improvements in logistical and operational aspects of the system. First, the system enables access to be given on-demand and in real-time to any individual in possession of an electronic programmable key. Thus, individuals seeking access to the remote sites can avoid wasting time, energy or money associated with travelling to and from a network operations center or other location in order to receive or program a key prior to visiting a remote site and/or to return the key afterwards. The second improvement relates to enhanced verification techniques that are associated with the generation and distribution of lock attendance codes. The lock attendance codes enable quick and easy confirmation that sites were serviced, and therefore the network operations center can verify when the individuals performed the tasks, the amount of time spent on the tasks, and whether the individuals attempted to access restricted areas at the remote sites. These improvements greatly reduce cost, time and effort, thereby improving the efficiency of the system while enhancing security and control measures, and additionally reduce the required carbon footprint.

The data collected by the network operations center can also be utilized for a variety of other advantageous purposes. For example, because the operations center can remotely monitor the status of the electronic locks and other system components (both in real-time and based on stored historical data), the system enables administrators to verify that service-level agreements (SLAs) with contractors, maintenance personnel or other third-party service providers are being satisfied, and to ensure that employees at the sites are not colluding to circumvent their responsibilities or for other reasons. The data collected by the operations center can also be analyzed by the system to detect patterns associated with false alarms that may arise at the sites.

Even further, advantages can be attributed to the reductions in other costs associated with the system. Specifically, the cost savings can be attributed to a variety of different features including, but not limited to, those which relate to verifying satisfaction of SLAs, monitoring billable hours for performing tasks, and reducing overall expenses required to perform tasks.

Figure 1:
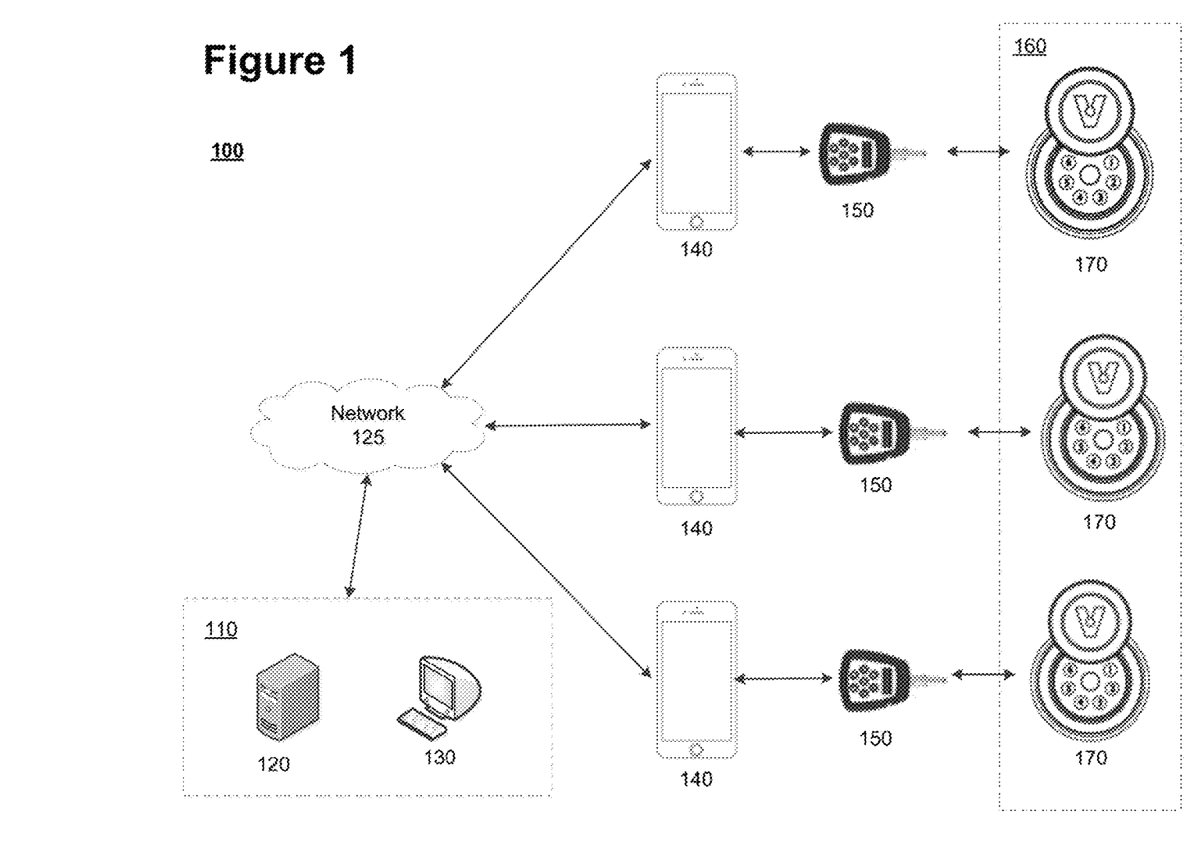
FIG. 1 is a block diagram of an access control system in accordance with certain embodiments of the present invention.

FIG. 1 is a block diagram of an exemplary access control system 100 in accordance with certain embodiments of the present invention. The access control system 100 comprises, inter alia, at least one a network operations center 110 that includes one or more servers 120 and/or one or more administrator devices 130, one or more mobile devices 140, one or more electronic programmable keys 150, and at least one remote site 160 that includes one or more electronic locks 170. The network operations center 110, including the servers 120 and administrator devices 130, are configured to communicate with the mobile devices over a network 125. The network 125 may be any type of network, such as one that includes the Internet, a local area network, a wide area network, an intranet, a virtual private network, a cellular network, a personal area network, and/or other type of network. In certain embodiments, the network operations center 110 may also be configured to communicate with the electronic programmable keys 150, the electronic locks 170 and the remote site 160 (e.g., servers or computing devices located at the remote site) over the network 125.

Each electronic programmable key 150 may include a storage device (e.g., RAM, ROM, PROM, SRAM, etc.), processor (e.g., central processing unit or CPU), input device (e.g., electronic keypad or touch screen device) and display screen. In certain embodiments, the electronic programmable keys 150 may also include components or devices that are configured to communicate with the electronic locks 170 using near-field communication (NFC), Bluetooth, Wi-Fi, or other communication protocols. The key 150 may be configured to store data associated with one or more opening codes that will enable the key to open one or more electronic locks 170, receive opening codes entered via an input device on the key 150, activate the key 150 in response to determining that a received opening code is valid, unlock one or more electronic locks 170 when the key 150 is activated and engaged with the one or more electronic locks 170, download access logs from the one or more electronic locks 170, generate lock attendance codes, display the lock attendance codes on a display screen located on the key 150, and perform other related functions.

The electronic locks 170 are located at remote sites 160 and each may include a storage device, processor and one or more components for communicating with electronic keys 150. The electronic locks may be unlocked in response to being engaged by an electronic key 150 that has been activated by a valid opening code during a specified timeframe in which access is granted to an individual. The storage device associated with the electronic lock 170 may store an access log which includes various information related to entry attempts. For example, each time a lock 170 is engaged by a key 150, the access logs may be updated to include an entry that identifies the lock 170 and key 150 (e.g., using unique identifiers), the time that the entry attempt occurred, and data that indicates whether or not the entry attempt was successful. The electronic lock 170 may also include communication devices for transferring the access logs to electronic keys 150 (e.g., using a direct electrical connection, RFID or NFC protocols).

The network operations center 110 may be responsible for overseeing security at a plurality of remote sites 160 (e.g., locations associated with cell phone towers, radio towers, fueling sources or power supplies). From time to time, it may be desired to provide individuals with access to one or more of the remote sites 160 (e.g., in order to perform repairs or maintenance, to re-fill fueling containers, to check on a security issue, or for other reasons). The network operations center 110 may include, or be associated with, one or more servers 120 and/or one or more administrator computing devices 130 and each server 120 and administrator device 130 may include a storage device and a processor. The servers 120 and/or administrator devices 130 may be configured to perform various functions for providing and managing selective access to the secured locations. Exemplary functions that may be executed by the servers 120 and/or administrator devices 130 may include functions associated with programming electronic keys 150, generating opening codes for activating electronic keys 150, transmitting the opening codes to individuals (e.g., to mobile devices 140 operated by the individuals), and verifying that electronic keys 150 were used to engage electronic locks 170 at the remote sites 160 (e.g., by decoding lock attendance codes).

According to certain embodiments, after an individual utilizes the electronic key 150 at the remote site 160, the individual may activate a verification function on the electronic key 150 that will generate a lock attendance code that enables an administrator or network operations center 110 to confirm that the individual successfully accessed one or more locks 170 at the remote site 160. The individual may activate the verification function by selecting an option or sequence of options on a keypad or other input device that is included on the electronic key 150. For example, the electronic key 150 may include a specific button or input option that initiates the verification function when selected by the individual three times consecutively. Regardless of how the verification function is activated, the electronic key 150 may generate a lock attendance code that can be transmitted to an administrator and/or operations center 110 (e.g., to a server 120 or administrator device 130 located at the operations center 110) to confirm that the individual accessed the remote site 160. In certain embodiments, the lock attendance code and/or associated access logs may also be periodically downloaded to a device (e.g., a server 120 or administrator device 130) located at the operations center.

The manner in which the lock attendance code is generated may vary. Upon initiation of the verification function, the key 150 may analyze the access logs stored on the key 150 in order to make an initial determination regarding whether or not to generate a lock attendance code. In certain preferred embodiments, the key 150 will only generate the lock attendance code if the individual desiring access to the remote site 160 attempted to open one or more of the electronics locks 170 at the remote site 160 using the electronic key 150 (after being activated with a valid opening code) and within a specified timeframe in which the individual was granted access to the remote site 160. Thus, if the individual did not use the key 150 to access the remote site 160 (e.g., because the individual failed to show up for an assignment or task) or did so outside the timeframe in which access to the remote site 160 was granted, the key 150 may not generate a lock attendance code and the individual will not be able to provide confirmation that he or she accessed the locks 170 at the remote site 160.

In certain embodiments, the opening code utilized to activate a key 150 includes embedded information that determines the timeframe in which the individual is given access to the remote site 160 and a lock or set of locks 170 that the key 150 can open within the timeframe. In the event that the key 150 generates a lock attendance code, it may also include embedded data or information that permits the administrator to confirm that the individual accessed the remote site 160 within the timeframe in which access was given to the remote site 160. The embedded information associated with the lock attendance code can identify the particular locks 170 that were opened using the key 150 within the timeframe. For example, an opening code, once entered to activate a key 150, may allow the key 150 to unlock ten different locks 170 at a remote site 160 and the lock attendance code generated by the key 150 can be used by an administrator or network operations center 110 to identify the specific locks 170 that were opened. In certain embodiments, the lock attendance code may also include embedded information relating to entry attempts in which access was denied. For example, it may identify the lock 170 that denied access to the key 150, the time of the entry attempt, etc.

The manner in which the lock attendance code is generated, as well as the information that can be derived from the lock attendance code, may vary. According to certain embodiments, the key 150 generates the lock attendance code by retrieving information from the access logs stored on the key 150 and utilizing the retrieved information as inputs to a function (e.g., a hash function or other function) that is configured to output a unique string comprised of numeric or alphanumeric characters. The outputted string may represent the lock attendance code and may include embedded information that confirms that the individual accessed one or more locks 170 at the remote site 160. The information embedded in the lock attendance code may also include other types of information associated with the individual's entry attempt. For example, the embedded information may indicate the time of the entry attempt, a set of global position system (GPS) coordinates identifying the location of the key 150 at the time of the entry attempt, one or more specific locks 170 at the remote site 160 that were engaged by the key 150 within the specified timeframe during which access was granted, and/or other related information. After the individual transmits the lock attendance code (e.g., via the network 125), an administrator may receive the lock attendance code at the network operations center 110 and may utilize a corresponding function to decipher or interpret the lock attendance code in order to confirm that the individual accessed the locks 170 at the remote site 160 and to retrieve the embedded information.

In other alternative embodiments, the key 150 may simply generate a random code that represents the lock attendance code. The fact that the key generated the lock attendance code may itself provide verification that the individual accessed a lock or set of locks 170 at the remote site 160 within the timeframe in which access was granted. In even further embodiments, the lock attendance code may be generated or correlated in some manner to the opening code that is provided. For example, when generating the lock attendance code, the key 150 may use the opening code as an input to a function that generates a unique lock attendance code that is based on the opening code. The lock attendance code may be generated using other techniques as well.

After the lock attendance code is generated, it can be transmitted to and/or utilized by an administrator or operations center 110 in various ways. In certain embodiments, the individual transmits the lock attendance code by sending a text message (e.g., using short message service or SMS protocols) using a mobile device 140 (e.g., cell phone, smart phone or personal digital assistant). In certain embodiments, mobile device 140 may communicate with or include a mobile reader device (e.g., which may be capable of remotely programming the key and reading data stored on the key) to generate and/or transmit the lock attendance code to the operations center. For example, a mobile reader device may be coupled to the mobile device 140 to read the data on the key 150. The text message may be sent to one or more mobile devices associated with administrators, one or more administrator devices 130 and/or one or more servers 120 associated with an operations center 110. The individual may also send the text message to a phone number or address for an automated verification system associated with an operations center 110 that is able to process the lock attendance code included in the message and provide confirmation that the individual accessed the remote site 160 without human assistance. The individual may alternatively or additionally transmit the lock attendance code via a mobile application that is installed on the individual's mobile device 140 and/or by submitting the lock attendance code via an input form that is accessible on a website hosted by or associated with the operations center 110. In certain embodiments, the lock attendance code may be automatically transmitted to the administrator or network operations center 110 by the electronic key 150 if the electronic key 150 that generated the code is coupled to, and includes components for communicating over a network 125, e.g., such as a local area network (LAN), Bluetooth network, the Internet and/or other network. The lock attendance code may also be transmitted by e-mail or over a phone connection (e.g., by placing a phone call to an administrator or an automated phone service associated with the network operations center 110). The lock attendance code can be communicated to an administrator or network operations center 110 in other ways as well.

In certain embodiments, the electronic locks 170 located at the remote sites 160 may additionally, or alternatively, be opened using a keypad that is included on the locks 170. For example, a passcode may be transmitted to a mobile device 140 of an individual and the individual may enter the passcode into the keypad provided on the electronic lock 170. The electronic lock 170 includes processes that can validate the passcode by comparing the password entered by the user with passcodes generated by the processes stored on the electronic lock 170. The electronic lock 170 may grant the user access if the passcodes match.

In certain embodiments, the passcode may be a dynamic passcode generated by a Code Generation System (CGS). A dynamic passcode may represent a unique, single-use, time-limited or one-time passcode that is generated by the network operations center 110 (e.g., the server 120 or administrator device 130) upon request. The passcode may be based in part on the time the passcode was requested.

According to certain embodiments, the generation of the passcode provided to the individual is based on unique information about the individual's mobile device 140 and the time the passcode is requested or being generated. For a mobile device 140, the passcode may be based on, for example, the International Mobile Equipment Identity ("IMEI"), the network ID of the mobile device, or a combination of the two IDs, and the time the request was sent from the mobile device 140.

Alternatively, the passcode may be fixed. A fixed passcode does not change or expire, may be used more than once, and may be obtained without request from a master or administrator. Administrators who wish to prevent fixed passcodes from being compromised may require fixed passcodes to be used in conjunction with other information or a biometric scan, e.g., in scenarios in which the electronic locks 170 are equipped with biometric scanning equipment (e.g., eye scanners or finger print scanners).

A request for a dynamic or fixed passcode by transmitted to an administrator. The request may be transmitted by made by an individual attending to a service request. For example, an individual's mobile device 140 may include a mobile application that allows the individual to send a request for a passcode to a server 120, an administrator device 130, or any other device over the network 125 (e.g., via the mobile device's 140 cellular data, WiFi or NFC/Bluetooth connection). As another example, an individual may submit a request by placing a voice call or sending a text message to an administrator or server agent from the individual's mobile device 140. In this way, an individual may send a request even when the mobile device 140 is unable or incapable of connecting to the Internet or data network. In even further embodiments, an administrator or network operations center 110 may transmit a message or request that includes the passcode and/or opening code to an individual in possession of a key without the individual submitting a request for such information. The individual may be required to accept the message or request, or may be permitted to decline the message or request.

Figure 2:
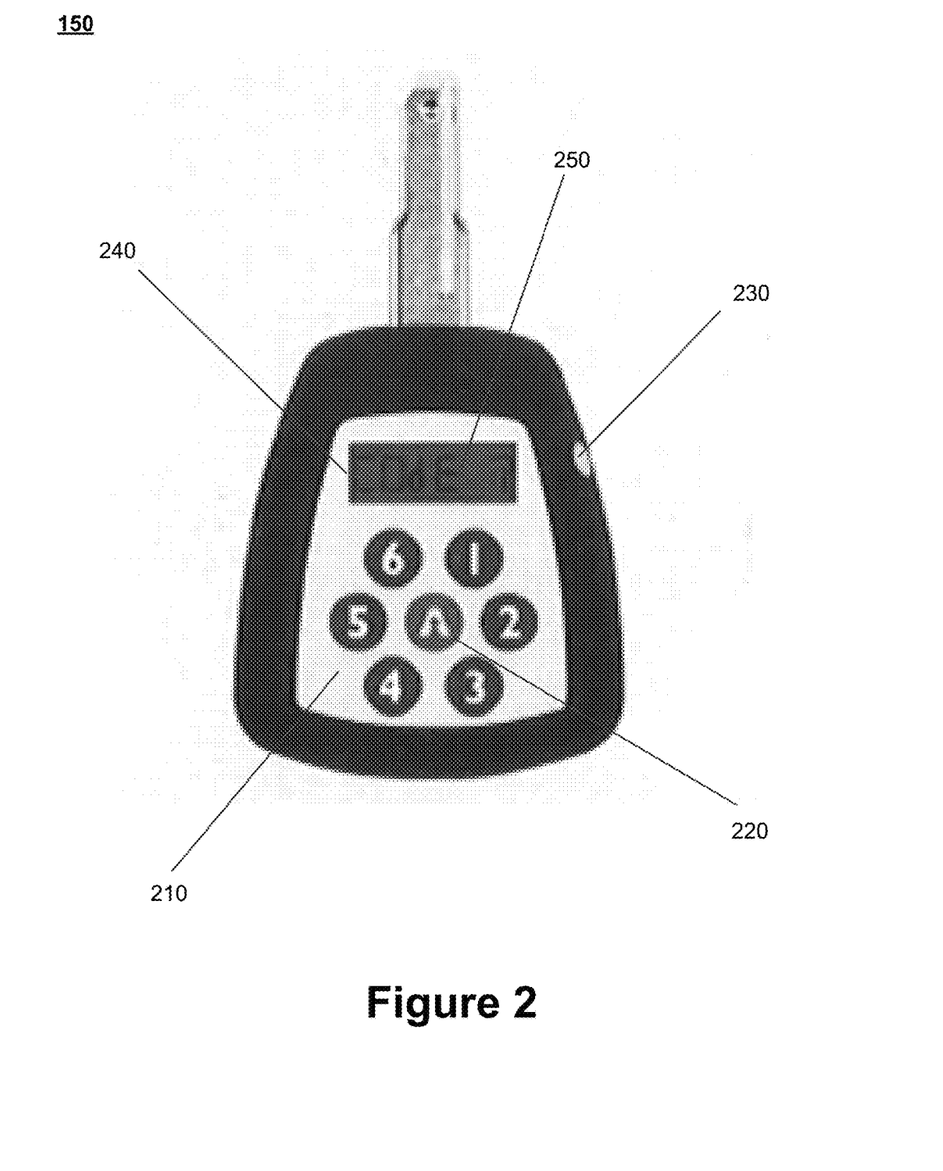
FIG. 2 is an illustration of an electronic programmable key in accordance with certain embodiments of the present invention.

FIG. 2 is an illustration of an exemplary electronic programmable key 150 in accordance with certain embodiments of the present invention. The electronic key 150 includes a keypad 210 having an activation key 220, a light emitting diode (LED) indicator 230, and a display screen 240 that is configured to display a lock attendance code 250 and other information.

In this exemplary embodiment, the keypad 210 on the electronic key 150 includes input options that are numbered one through six. The buttons may be selected by an individual to input or provide information (e.g., opening codes) to the electronic key 150. The keypad 210 further includes an activation key 220 that is configured to initiate a verification function that generates a lock attendance code 250. In certain embodiments, the key 150 generates a lock attendance code 250 in response to the individual selecting this activation key 220 three consecutive times and it displays the lock attendance code 250 on the display screen 250 included on the key.

The LED indicator 230 on the key may be utilized to convey certain information to the individual. For example, when the key 150 is inserted into a lock 170, the indicator 230 may display specific colors to indicate access permissions (e.g., green=access granted, red=access denied and orange=access denied at this particular time, but may be available at other dates/times). The indicator 230 may also provide indications (e.g., by blinking) when a battery in the key is running on lower power.

The key 150 may include other components and perform other functions as well. In certain embodiments, the key 150 may be outfitted with an radio-frequency identification (RFID) component, NFC component or proximity component that allows the key 150 to be used as a wireless badge that can lock or unlock the electronic locks 170 (e.g., rather than physically engaging the locks 170 with male portion of the key 150). In certain embodiments, the key 150 may also be outfitted with circuity or components that provide a built-in clock and calendar functions to enable temporary access rights to be assigned to individuals.

Figure 3:
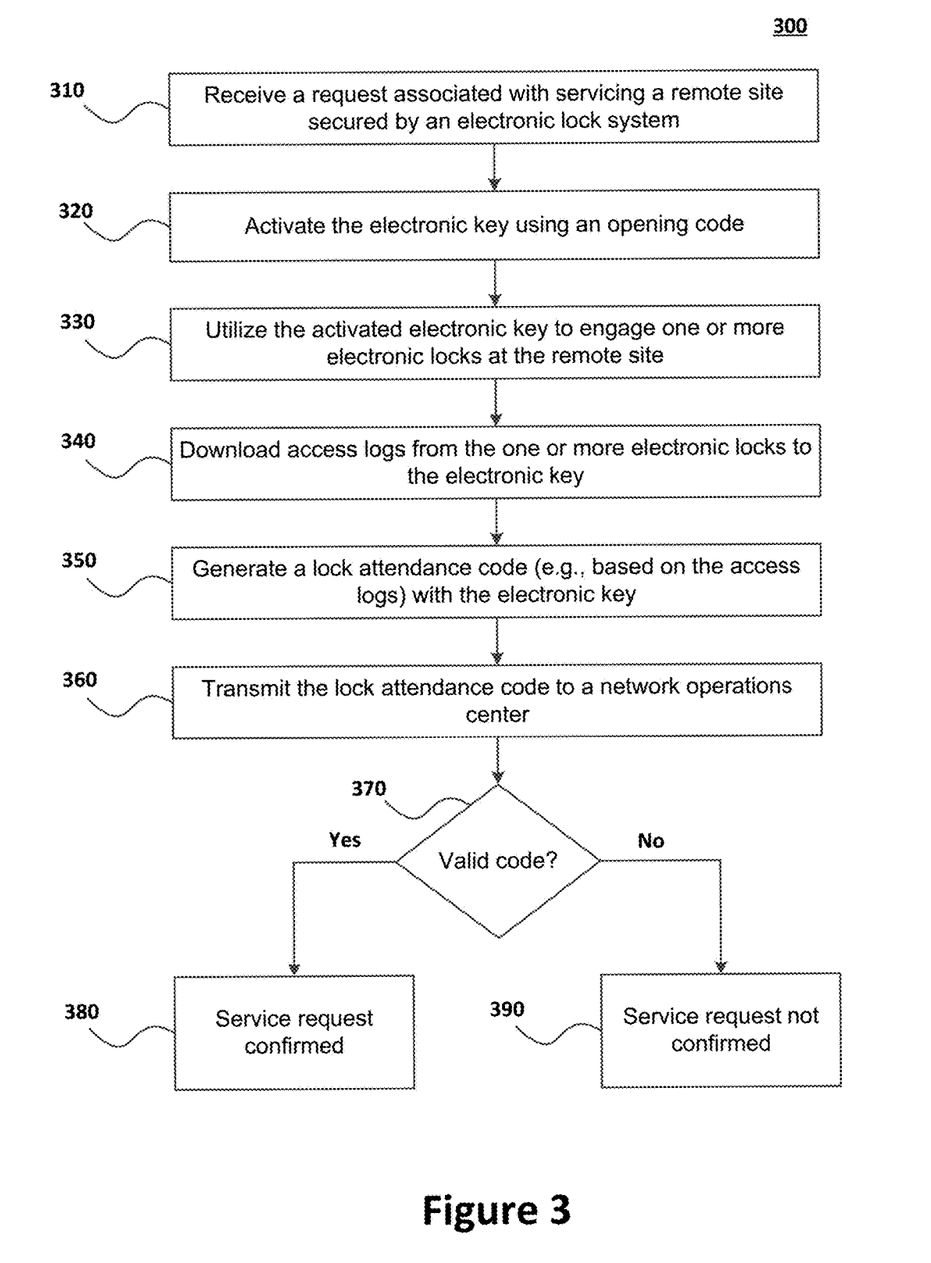
FIG. 3 is a flow chart of a method for verifying access at a remote site in accordance with certain embodiments of the present invention.

FIG. 3 is a flow chart of an exemplary method 300 for verifying access at a remote site 160 in accordance with certain embodiments of the present invention. A request associated with servicing a remote site 160 secured by an electronic lock system is received (step 310). In certain embodiments, the service request is transmitted by an administrator or network operations center 110, and the request is received by an individual (e.g., a contractor, staff member, employee, repairperson or service personnel) via a mobile device 140 or by other means. The request may include information pertaining to one or more tasks that are to be performed at the remote site. For example, the request may indicate that the individual is to visit a cell phone, radio tower or fuel station in order to make repairs or perform maintenance operations.

An opening code is utilized to activate an electronic key 150 (step 320). For example, the administrator or network operations center 110 may provide the individual with an opening code that enables an electronic key 150 in the possession of the individual to access secured locations at the remote sites. In certain embodiments, the opening code may be transmitted to the individual with the service request.

The activated electronic key 150 is then utilized to engage (e.g., lock or unlock) one or more electronic locks 170 located at the remote site 160 (step 330). In certain embodiments, the key 150 is only permitted to access specific areas of the remote site 160 and, therefore, can only unlock certain locks located at the remote site. The opening code that activates the electronic key 150 may be utilized by the key 150 to determine which locks 170 can be opened at the remote site 160 and/or the dates and times that the locks can be opened.

Access logs are downloaded from the one or more electronic locks 170 to the electronic key 150 (step 340). As explained above, an electronic lock 170 may store access logs that include information pertaining to entry attempts and/or other information, and these access logs may be transferred to the electronic key 150 from the electronic lock 170 each time the electronic key 150 engages the electronic lock 170.

Next, the electronic key generates a lock attendance code 250 (step 350). In certain embodiments, the individual attending to the service request may utilize the electronic key 150 to generate a lock attendance code after the service request is completed or has ended, and the attendance code may be displayed on a screen 240 integrated into the electronic key 150. As explained above, the lock attendance code may allow the individual to provide confirmation that the service request was attended to and/or the associated tasks were completed. The lock attendance code 250 may be generated with an encoder on the electronic key 150 based on the access logs or other information that is stored on the key 150.

The lock attendance code 250 is then transmitted to a network operations center 110 (step 360). The lock attendance code 250 may be transmitted to a network operations center 110 by a mobile device 140 being operated by the individual (e.g., via a text message, phone call or an application stored on the mobile device 140) and/or directly by the electronic key 150 (e.g., if the electronic key includes components to enable wireless transmission of the lock attendance code 250).

Next, a determination is made regarding whether the lock attendance code 250 is valid (step 370). This determination may be made using a decoder or function that is installed on a device (e.g., a server 120 or administrator computing device 130) associated with the network operations center 110. The completion of the service request is confirmed if the lock attendance code is determined to be valid (step 380). Otherwise, the completion of the service request is not confirmed (step 390).

Figure 4:
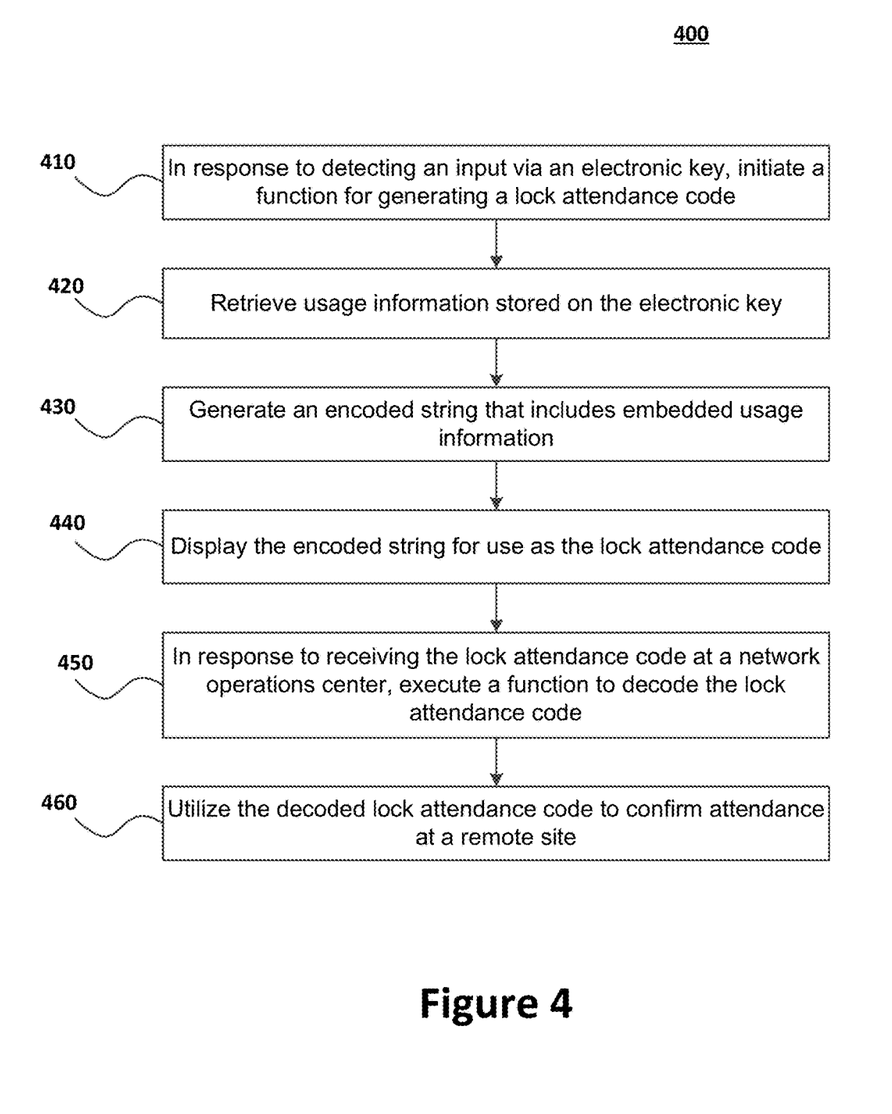
FIG. 4 is a flow chart of a method for generating and decoding a lock attendance code in accordance with certain embodiments of the present invention.

FIG. 4 is a flow chart of a method 400 for generating and decoding a lock attendance code 250 in accordance with certain embodiments of the present invention. In response to detecting an input via an electronic key 150, a function is initiated for generating a lock attendance code (step 410). For example, after an individual has completed a service request, the individual may select an input option (e.g., an activation key 220) included on the electronic key 150 to initiate the function for generating the lock attendance code.

Usage information stored on the electronic key is retrieved (step 220). The usage information may include access logs, records, or other data that identifies the times and dates when the key 150 was used, GPS coordinates identifying locations where the key 150 was used, identifiers associated with locks 170 that were engaged by the key 150, an identifier associated with the key 150, access indicators which indicate whether the key 150 was granted or denied access to the locks, and/or and other relevant information.

An encoded string is generated that includes embedded information associated with the usage information (step 430). The string may be generated using an encoder, hash function or other feature integrated into the electronic key 150. The encoded string is then displayed for use as the lock attendance code (step 440). In certain embodiments, the encoded string which represents the lock attendance code 250, is displayed on a display screen 240 included on the electronic key 150.

In response to receiving the lock attendance code 250 at a network operations center 110, a function is executed to decode the lock attendance code (step 450). The function may be executed by a decoder or other that is included on a server 120 or administrator computing device 130 located at or associated with the network operations center 110. The decoded lock attendance code is utilize to confirm whether or not an individual attended a remote site 160 (step 460).

The embodiments described in this disclosure can be combined in various ways. Any aspect or feature that is described for one embodiment can be incorporated to any other embodiment mentioned in this disclosure. Moreover, any of the embodiments described herein may be hardware-based, software-based and preferably comprise a mixture of both hardware and software elements. Thus, while the description herein may describe certain embodiments, features or components as being implemented in software or hardware, it should be recognized that any embodiment, feature or component that is described in the present application may be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

While various novel features of the invention have been shown, described and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. An access control system, comprising:
one or more electronic locks;
a portable electronic programmable key which includes a processor and a non-transitory storage device for storing instructions, wherein execution of the instructions causes the portable electronic programmable key to:
generate a lock attendance code using a verification function, wherein the lock attendance code comprises a string that can be used to verify engagement of the portable electronic programmable key with the one or more electronic locks and to verify attendance of an individual at one or more locations that include the one or more electronic locks.

2. The access control system of claim 1, wherein the instructions further cause the portable electronic programmable key to:
store usage information on the portable electronic programmable key pertaining to interactions between the portable electronic programmable key and the one or more electronic locks.

3. The access control system of claim 2, wherein the usage information stored on the portable electronic programmable key is utilized, at least in part, to generate the lock attendance code.

4. The access control system of claim 1, wherein:
the one or more electronic locks are located at a site that comprises a plurality of electronic locks;
an opening code is used to activate the portable electronic programmable key; and
the opening code enables selective access to a subset of the plurality of electronic locks at specified times or dates.

5. The access control system of claim 1, wherein the lock attendance code can be used to derive information relating to times and dates when the portable electronic programmable key was used, the one or more locations where the portable electronic programmable key was used, or whether entry attempts were granted or denied at the one or more electronic locks.

6. The access control system of claim 1, wherein the system further comprises a network operations center that manages security for a plurality of sites, and the network operations center includes a computing device that is configured to receive and decode the lock attendance code.

7. The access control system of claim 1, wherein an opening code is transmitted wirelessly to a mobile device of a service provider and the opening code is entered into an input device of the portable electronic programmable key to activate the portable electronic programmable key to open the one or more electronic locks.

8. The access control system of claim 1, wherein the portable electronic programmable key includes a display screen that is configured to output the lock attendance code on the display screen.

9. A method for controlling access, comprising: activating a portable electronic programmable key to open one or more electronic locks; generating, by the portable electronic programmable key, a lock attendance code using a verification function, wherein the lock attendance code comprises a string that can be used to verify engagement of the portable electronic programmable key with the one or more electronic locks and to verify attendance of an individual at the one or more locations that include the one or more electronic locks.

10. The method of claim 9, wherein the method further comprises:
storing usage information on the portable electronic programmable key pertaining to interactions between the portable electronic programmable key and the one or more electronic locks.

11. The method of claim 10, wherein the usage information stored on the portable electronic programmable key is utilized, at least in part, to generate the lock attendance code.

12. The method of claim 9, wherein:
the one or more electronic locks are located at a site that comprises a plurality of electronic locks;
an opening code is used to activate the portable electronic programmable key; and
the opening code enables selective access to a subset of the plurality of electronic locks at specified times or dates.

13. The method of claim 9, wherein the lock attendance code can be used to derive information relating to times and dates when the portable electronic programmable key was used, the one or more locations where the portable electronic programmable key was used, or whether entry attempts were granted or denied at the one or more electronic locks.

14. The method of claim 9, wherein a network operations center manages security for a plurality of sites, and the network operations center includes a computing device that is configured to receive and decode the lock attendance code.

15. The method of claim 9, wherein an opening code is transmitted wirelessly to a mobile device of a service provider and the opening code is entered into an input device of the portable electronic programmable key to activate the portable electronic programmable key to open one or more electronic locks.

16. The method of claim 9, wherein the portable electronic programmable key includes a display screen that is configured to output the lock attendance code on the display screen.

17. A portable electronic programmable key for verification of attendance at a location, the key comprising a processor and a non-transitory storage device for storing instructions, wherein execution of the instructions enables the portable electronic programmable key to generate a lock attendance code using a verification function, wherein the lock attendance code comprises a string that can be used to verify engagement of the portable electronic programmable key with one or more locks at the location and to verify attendance of an individual at the location that includes the one or more locks.

18. The portable electronic key of claim 17, wherein the instructions further cause the portable electronic programmable key to:
store usage information on the portable electronic programmable key pertaining to interactions between the portable electronic programmable key and the one or more electronic locks.

19. The portable electronic key of claim 18, wherein the usage information stored on the portable electronic programmable key is utilized, at least in part, to generate the lock attendance code.

20. The portable electronic key of claim 17, wherein the portable electronic programmable key includes a display screen that is configured to output the lock attendance code on the display screen.

* * * * *